(12) United States Patent
Whaling et al.

(10) Patent No.: US 8,083,495 B2
(45) Date of Patent: Dec. 27, 2011

(54) EJECTORS WITH SEPARABLY SECURED NOZZLES, ADJUSTABLE SIZE NOZZLES, OR ADJUSTABLE SIZE MIXING TUBES

(75) Inventors: Kenneth Neil Whaling, Simpsonville, SC (US); Dean Matthew Erickson, Simpsonville, SC (US); Hua Zhang, Greer, SC (US); David Wesley Ball, Jr., Easley, SC (US); James L. Davis, Taylors, SC (US); Michael Savale, Queensbury, NY (US); Douglas S. Byrd, Greer, SC (US)

(73) Assignee: General Electric Company, Schenectady, NY (US)

( * ) Notice: Subject to any disclaimer, the term of this patent is extended or adjusted under 35 U.S.C. 154(b) by 750 days.

(21) Appl. No.: 12/191,748

(22) Filed: Aug. 14, 2008

(65) Prior Publication Data

US 2010/0040482 A1    Feb. 18, 2010

(51) Int. Cl.
F04F 5/46 (2006.01)
F04F 5/48 (2006.01)
F04F 5/00 (2006.01)
F04F 5/44 (2006.01)

(52) U.S. Cl. .......... 417/189; 417/54; 417/185; 417/197; 417/198

(58) Field of Classification Search .......... 417/182, 417/185, 187, 188, 189, 198; 60/782, 785, 60/806; 239/451, 452, 455, 533.13, 546; 415/115

See application file for complete search history.

(56) References Cited

U.S. PATENT DOCUMENTS

| | | | | |
|---|---|---|---|---|
| 3,003,312 A * | 10/1961 | Jewell | ...................... | 239/265.35 |
| 3,891,353 A * | 6/1975 | Templeman | .................. | 417/183 |
| 4,595,344 A * | 6/1986 | Briley | ............................ | 417/185 |
| 5,535,770 A * | 7/1996 | Nurmi | ............................. | 137/14 |
| 6,523,346 B1 * | 2/2003 | Hoffmann et al. | ............. | 60/646 |
| 6,615,574 B1 | 9/2003 | Marks | | |
| 2003/0046938 A1 * | 3/2003 | Mortzheim et al. | ........... | 60/782 |
| 2005/0258275 A1 * | 11/2005 | Williams | ...................... | 239/518 |
| 2007/0125092 A1 | 6/2007 | Wolfe et al. | | |
| 2008/0089780 A1 | 4/2008 | Erickson et al. | | |

* cited by examiner

Primary Examiner — Devon C Kramer
Assistant Examiner — Thomas Fink
(74) Attorney, Agent, or Firm — Sutherland Asbill & Brennan LLP

(57) ABSTRACT

An ejector comprising a motive inlet, a motive nozzle separably secured to the motive inlet, a suction chamber about the motive nozzle, a suction fluid inlet to the suction chamber, a mixing tube in fluid communication with the suction chamber and the motive nozzle, a diffuser in fluid communication with the mixing tube and distal the suction chamber and the motive nozzle, and an outlet from the diffuser is provided. A nozzle comprising at least two concentric arc nozzle portions is also provided. An ejector comprising a mixing tube including a flexible layer adapted to compress or stretch, thereby allowing a mixing tube diameter to change is further provided.

9 Claims, 6 Drawing Sheets

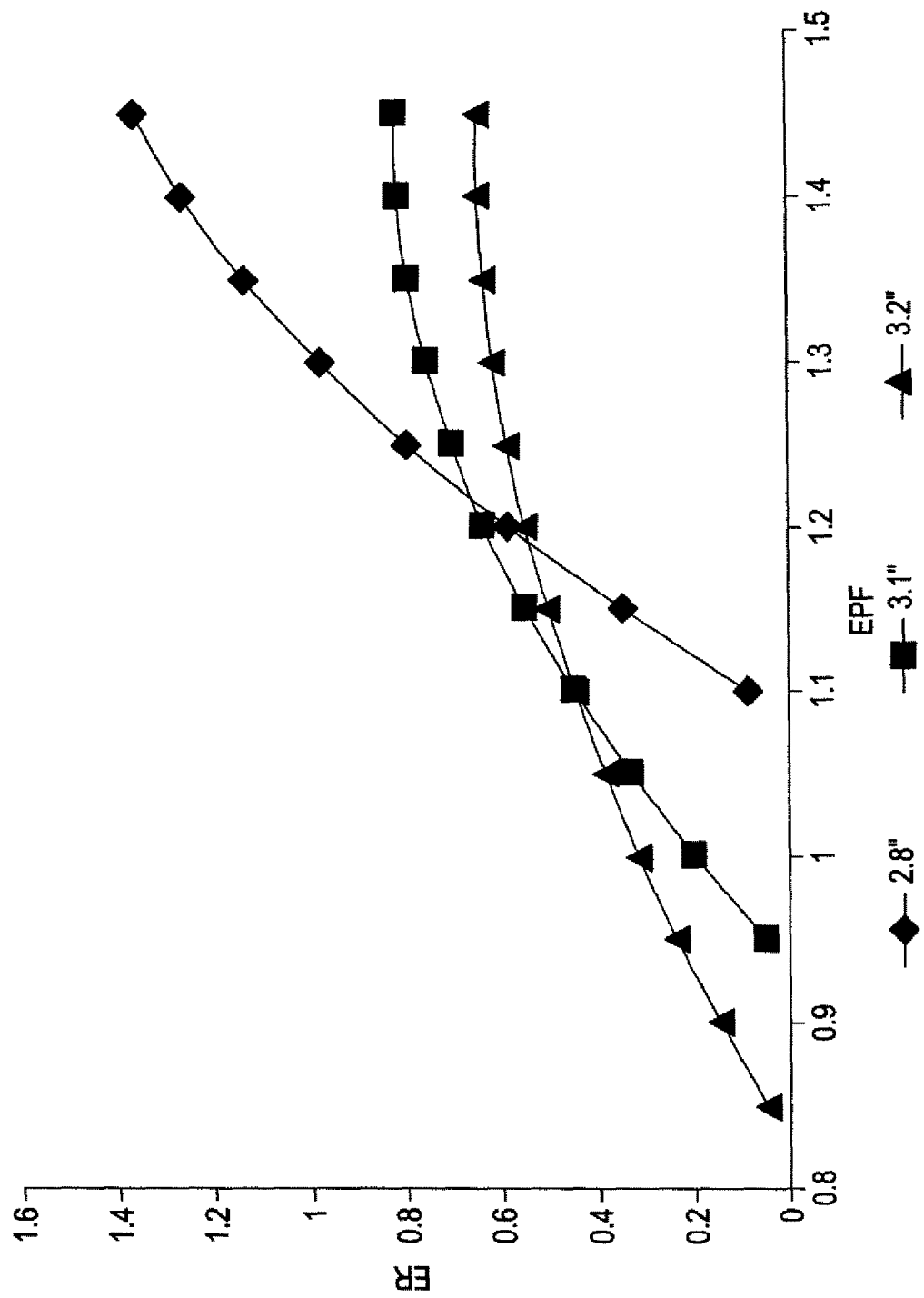

EJECTORS WITH SEPARABLY SECURED NOZZLES, ADJUSTABLE SIZE NOZZLES, OR ADJUSTABLE SIZE MIXING TUBES

TECHNICAL FIELD

This disclosure generally relates to ejectors and nozzles, and more particularly relates to ejector nozzles.

BACKGROUND OF THE INVENTION

In various systems, the efficiency of a system may be dependent on effectively providing cooling or sealing fluid to the system. For instance, in gas turbine systems, it may be desirable to provide cooling and/or sealing air by diverting a portion of the air in the compressor using an ejector. For instance, a first airflow may be extracted from a thirteenth stage of the compressor to cool one stage of the turbine. A second airflow may also be extracted from a ninth stage of the compressor (i.e., at a lower pressure and temperature) to another stage of the turbine. The ejector may be used to mix the first and second airflows to provide a third airflow at a temperature and pressure for cooling the appropriate turbine stage without the need to throttle (i.e., waste) airflow that may be at too high a pressure.

Typically, an ejector may be optimized for the International Organization for Standardization (ISO) conditions (i.e., 59° F. environment temperature). However, efficiency may be affected at operating conditions other than ISO conditions. In addition, typical fixed ejector designs may be operated at less than maximum efficiency under operating conditions such as the ambient environment of a location. For example, on hot days, the ejector may deliver more air than required and may overflow, while on cold days, the ejector may not deliver enough air. Thus, some ejectors designed for hotter operating conditions may not provide the required performance in colder operating conditions and vice versa. Design and use of specific ejectors for different ambient operating conditions generally may be costly, cost prohibitive, and/or labor intensive. For instance, changing the dimensions of a motive nozzle in an ejector for different operating conditions may involve changing the nozzle and the whole motive flow system, including numerous pipes and flanges, to which the motive nozzle may be welded.

Accordingly, there is a need for improved ejector which avoid one or more of the aforementioned disadvantages and deficiencies to provide improved efficiency in the systems associated with the ejectors.

SUMMARY OF THE INVENTION

This disclosure provides an ejector comprising a motive inlet, a motive nozzle separably secured to the motive inlet, a suction chamber about the motive nozzle, a suction fluid inlet to the suction chamber, a mixing tube in fluid communication with the suction chamber and the motive nozzle, a diffuser in fluid communication with the mixing tube and distal the suction chamber and the motive nozzle, and an outlet from the diffuser.

This disclosure also provides a nozzle comprising at least two concentric arc nozzle portions. Each of the concentric arc nozzle portions is adapted to rotate relative to each other on a longitudinal axis, have its arc radii change, or both, thereby allowing a nozzle geometry, a nozzle diameter, or both to change.

This disclosure further provides an ejector comprising a motive inlet, a motive nozzle, a suction chamber about the motive nozzle, a suction fluid inlet to the suction chamber, a mixing tube in fluid communication with the suction chamber and the motive nozzle, a diffuser in fluid communication with the mixing tube and distal the suction chamber and the motive nozzle, and an outlet from the diffuser. The mixing tube comprises a flexible layer adapted to compress or stretch, thereby allowing a mixing tube diameter to change.

Other objects, features, and advantages of this invention will be apparent from the following detailed description, drawings, and claims.

BRIEF DESCRIPTION OF DRAWINGS

FIG. 7 shows the results of Computational Fluid Dynamics models for evaluation of ejector performance with different nozzle diameters.

DETAILED DESCRIPTION OF EMBODIMENTS

As summarized above, this disclosure encompasses ejectors and a nozzle. Embodiments of the ejectors, nozzle, and methods for using the ejectors and nozzle are described below and illustrated in FIGS. 1-6. Though FIGS. 1-6 are illustrated and described with reference to embodiments for a gas turbine system, it should be understood that any system (e.g., other turbines systems, the GE H System turbine systems, turbo machine systems, electric machine systems) having an ejector or nozzle may likewise be employed or be made by alternate embodiments of the present disclosure.

Figure 1:
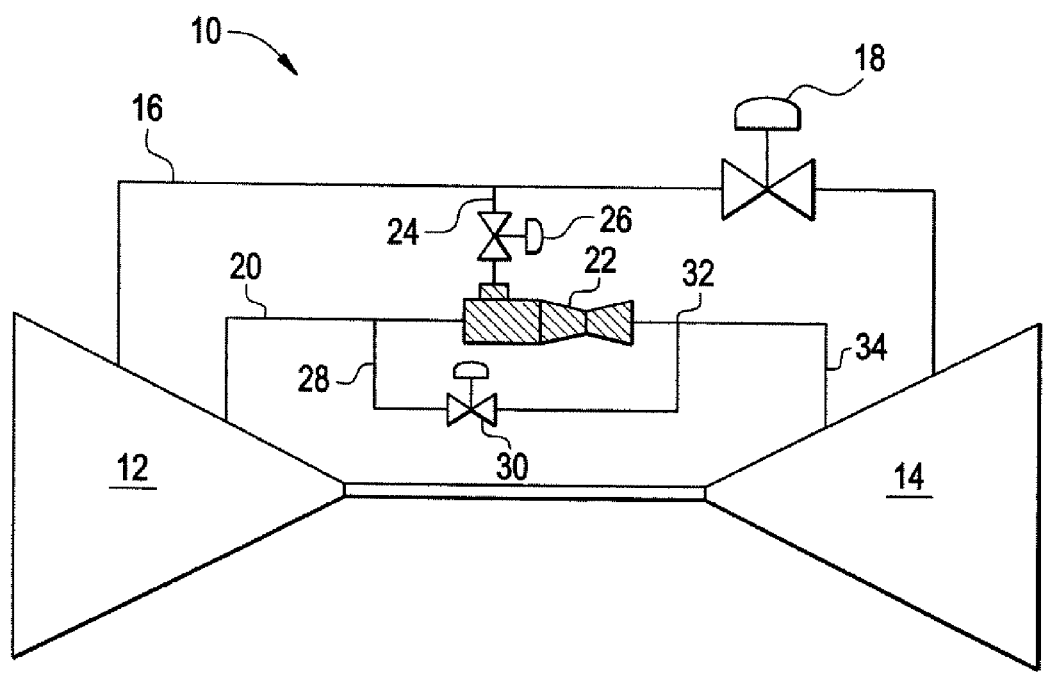
FIG. 1 illustrates a schematic of a gas turbine system 10 including an ejector 22 made in accordance with an embodiment of the present invention.

FIG. 1 illustrates an embodiment of the present disclosure which is a gas turbine system 10 including a cooling and/or sealing air supply system comprising a compressor 12, a gas turbine 14, a first airflow path 16 extracting air from a first stage of the compressor, a first diffuse valve 18, a second airflow path 20 extracting air from a second stage of the compressor, an ejector 22, a crossover flow path 24, an isolation valve 26, a bypass flow path 28, a bypass valve 30, a mixing point 32, and a third airflow path 34. Though the embodiments illustrated and described herein utilize air, it should be understood that other cooling or sealing fluids may be used in alternative embodiments. In addition, it should be understood that throughout this disclosure, embodiments of the paths described may be defined by any type of conduit, such as, but not limited to, pipes or fittings.

In this particular embodiment, a high pressure air extraction may be taken from a ninth stage of the compressor 12 and provided as a cooling airflow to a second stage nozzle of the turbine 14 via the first airflow path 16. As shown, multiple flow paths may be used. Similarly, bleed air also may be extracted from an earlier stage, for example a thirteenth stage of the compressor 12, and supplied via the second airflow path 20 as cooling air to the turbine 14. A bypass flow path 28 may be in communication with the second flow path 20.

In this embodiment, the ejector 22 may be positioned in the second flow path 20. The ejector 22 eliminates the need to dissipate airflow pressures. The ejector 22 also enables mixing of the airflow from the first and second flow paths 16, 20 so as to adjust the extraction flows to optimize the efficiency of the system 10. The crossover flow path 24 may be positioned between the first and second flow paths 16, 20. The crossover flow path 24 may include an isolation valve 26. The isolation valve 26 may isolate the ejector 22 when ambient conditions are not favorable.

Figure 2:
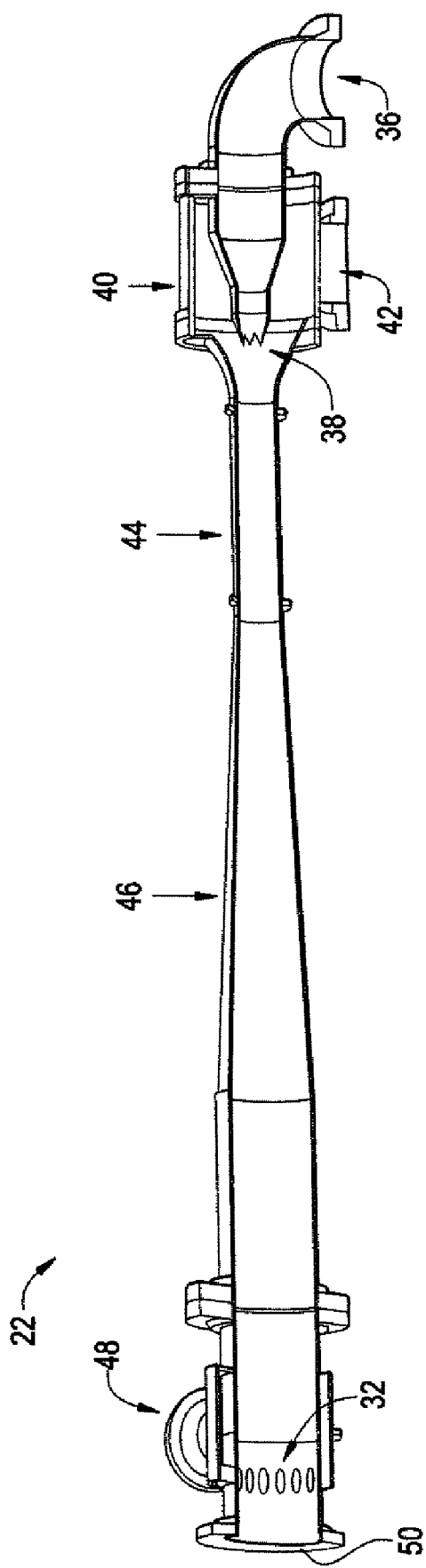
FIG. 2 illustrates an ejector 22 made in accordance with an embodiment of the present invention.

The ejector 22 made in accordance with an embodiment of the present invention is illustrated in farther detail in FIG. 2. The ejector 22 includes a motive inlet 36 connected to the second airflow path 20, a motive nozzle 38, and a suction chamber 40, a suction fluid inlet 42 connected to the first airflow path 16, a mixing tube 44, a diffuser 46, a bypass inlet 48, a mixing point 32, and an outlet 50 to the third airflow path 34.

In this embodiment, the motive nozzle 38 is separably securable to the motive inlet 36. As used herein, "separably securable" or "separably secured" refers to the attachment of the motive nozzle 38 to the motive inlet using any method which would allow the motive nozzle to be attached to the motive inlet for operation of the ejector and to be removed from the motive inlet without modification to the motive nozzle and/or motive inlet 1) such that each could be reinstalled in the ejector and reused or 2) without removal of any other ejector pipes or fittings.

Figure 3:
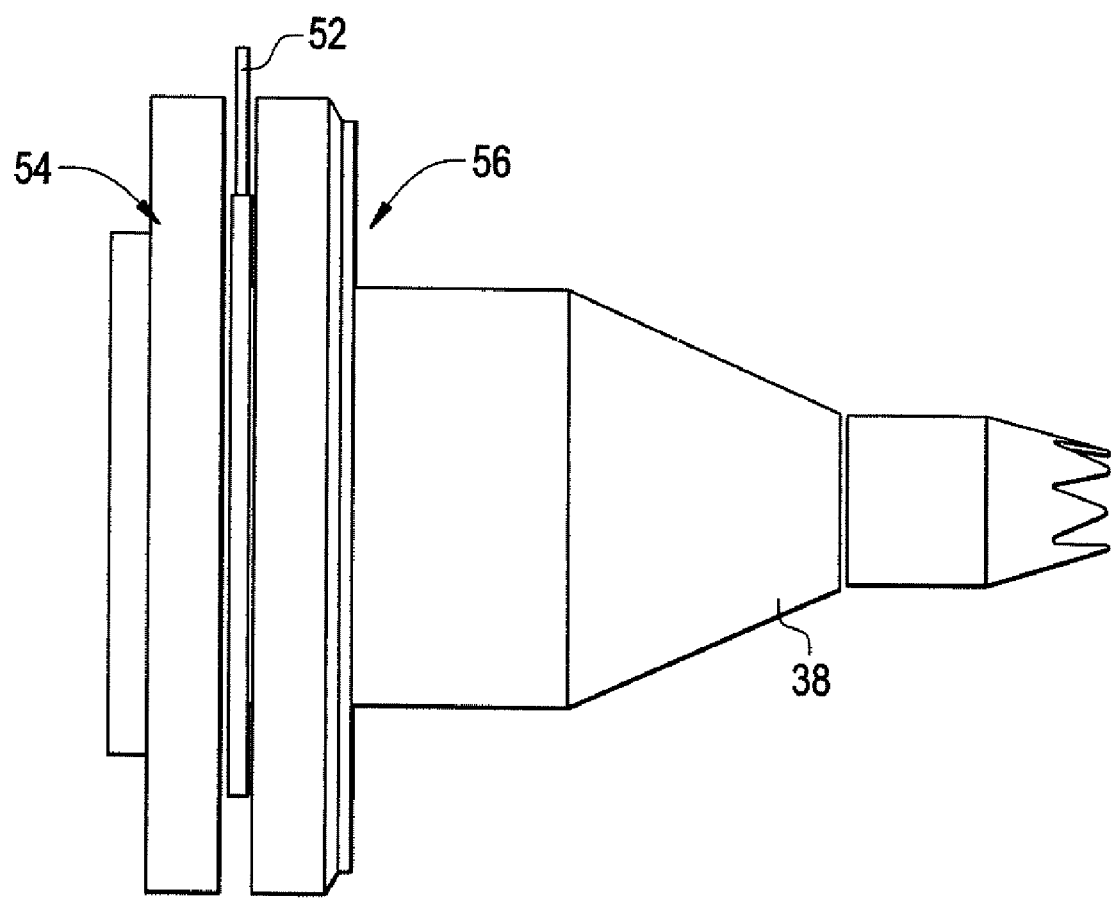
FIG. 3 illustrates a separably secured motive nozzle 38 made in accordance with an embodiment of the present invention.

FIG. 3 illustrates an embodiment of a separably securable motive nozzle 38 including a plate ring 52, while the motive inlet includes a first flange 54 and the suction chamber includes a second flange 56. The motive nozzle 38 may be separably secured to the motive inlet 36 by separably securing the plate ring 52 between the first flange 54 and the second flange 56. For example, the plate ring 52 may be separably secured between the first flange 54 and the second flange 56 using bolts, screws, clamps, or the like. Though the embodiment of the separably securable motive nozzle illustrated in FIG. 3 comprises a flange and plate ring attachment system, it should be understood that other methods for separably securing the motive nozzle to the motive inlet may be utilized, including, but not limited to, screwed devices or locking devices.

Figure 4A:
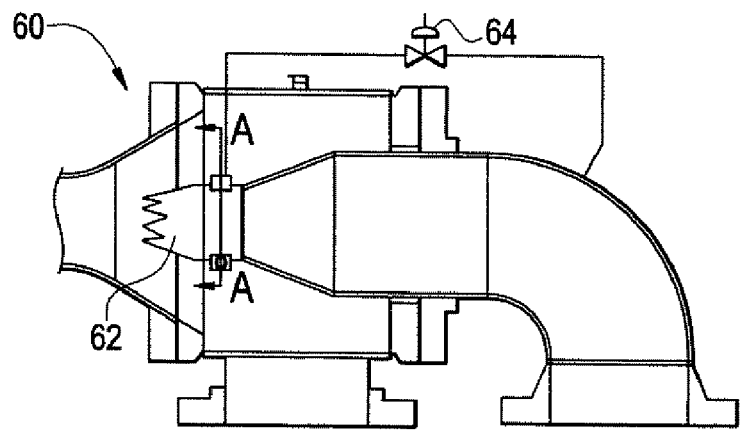
FIGS. 4A-B illustrate a motive nozzle 62 comprising two concentric arc nozzle portions 70, 72 made in accordance with an embodiment of the present invention.
Figure 4B:
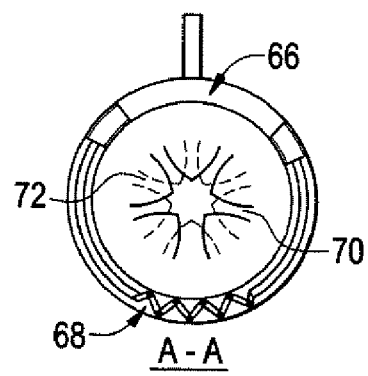

In an alternate embodiment, the motive nozzle may be configured to allow its nozzle geometry, nozzle diameter, or both to be changed. An embodiment of such a motive nozzle 62 is illustrated in FIGS. 4A-4B. As used herein, "nozzle geometry" refers to the shape of the tip of the motive nozzle or the shape of the teeth at the tip of the motive nozzle. As used herein, "nozzle diameter" (i.e., "nozzle size") refers to the diameter of the tip of the nozzle. In this embodiment, the motive nozzle 62 comprises two concentric arc nozzle portions 70, 72. Each of the two concentric arc nozzle portions 70, 72 may be adapted to rotate relative to each other on a longitudinal axis, have its arc radii change, or both, thereby allowing the nozzle geometry, the nozzle diameter, or both to change. In alternate embodiments, motive nozzles may comprise two or more concentric arc nozzle portions.

In some embodiments, a device for automatically rotating each of the concentric arc nozzle portions relative to each other on the longitudinal axis, automatically changing the arc radii of each of the concentric arc nozzle portions, or both may also be provided. As illustrated in FIGS. 4A-B, an embodiment of such a device can comprise a valve 64, a pressure regulated chamber 66, and a spring 68. The valve 64 may be regulated using a feedback control associated with the motive inlet pressure and/or the turbine pressure requirements or any other type of control system.

Therefore, in this embodiment, when more pressure is applied to the pressure regulated chamber 66, the spring 68 may rotate the concentric arc nozzle portions 70, 72 relative to each other on the longitudinal axis and/or compress and reduce the arc radii of the concentric arc nozzle portions. As a result of this change in the concentric arc nozzle portions 70, 72, the nozzle diameter may be reduced and the effective nozzle geometry may be changed as the nozzle teeth of the concentric arc nozzle portions overlap in a different configuration. Accordingly, when less pressure is applied to the pressure regulated chamber 66, the spring 68 may loosen and rotate the concentric arc nozzle portions relative to each other on the longitudinal axis and reduce the arc radii of the concentric arc nozzle portions. As a result of this change in the concentric arc nozzle portions, the nozzle diameter may be increased and the effective nozzle geometry may be changed as the nozzle teeth of the concentric arc nozzle portions overlap in a different configuration.

In other embodiments, the device for automatically rotating each of the concentric arc nozzle portions relative to each other on the longitudinal axis, automatically changing the arc radii of each of the at least two concentric arc nozzle portions, or both may comprise other components, including, but not limited to, electric motor driven devices. In alternate embodiments, the rotating each of the concentric arc nozzle portions relative to each other on the longitudinal axis or the changing the arc radii of each of the at least two concentric arc nozzle portions may be carried out manually.

Figure 5:
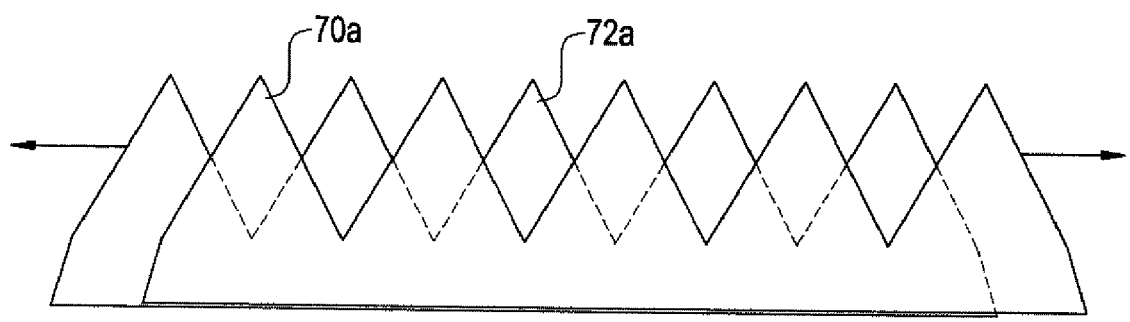
FIG. 5 illustrates a two-dimensional schematic of two concentric arc nozzle portions 70a, 72a made in accordance with an embodiment of the present invention.

FIG. 5 is a two-dimensional schematic of an embodiment of two concentric arc nozzle portions 70a, 72a which illustrates how each of the two concentric arc nozzle portions may be moved relative to each other in order to change the nozzle geometry and nozzle diameter.

As illustrated in FIGS. 2, 3, and 4, the embodiments of the motive nozzles have a nozzle geometry comprising a chevron shape. In alternate embodiments, the motive nozzle 38 may have any nozzle geometry known in the art, including, but not limited to a lobe shape.

In some embodiments, the motive nozzle 38, 62 may have a nozzle diameter ranging from about 1 inch to about 8 inches. In other embodiments, the motive nozzle 38, 62 may have a nozzle diameter ranging from about 2 inches to about 6 inches. In still other embodiments, the motive nozzle 38, 62 may have a nozzle diameter ranging from about 5 inches to about 6 inches.

Figure 6:
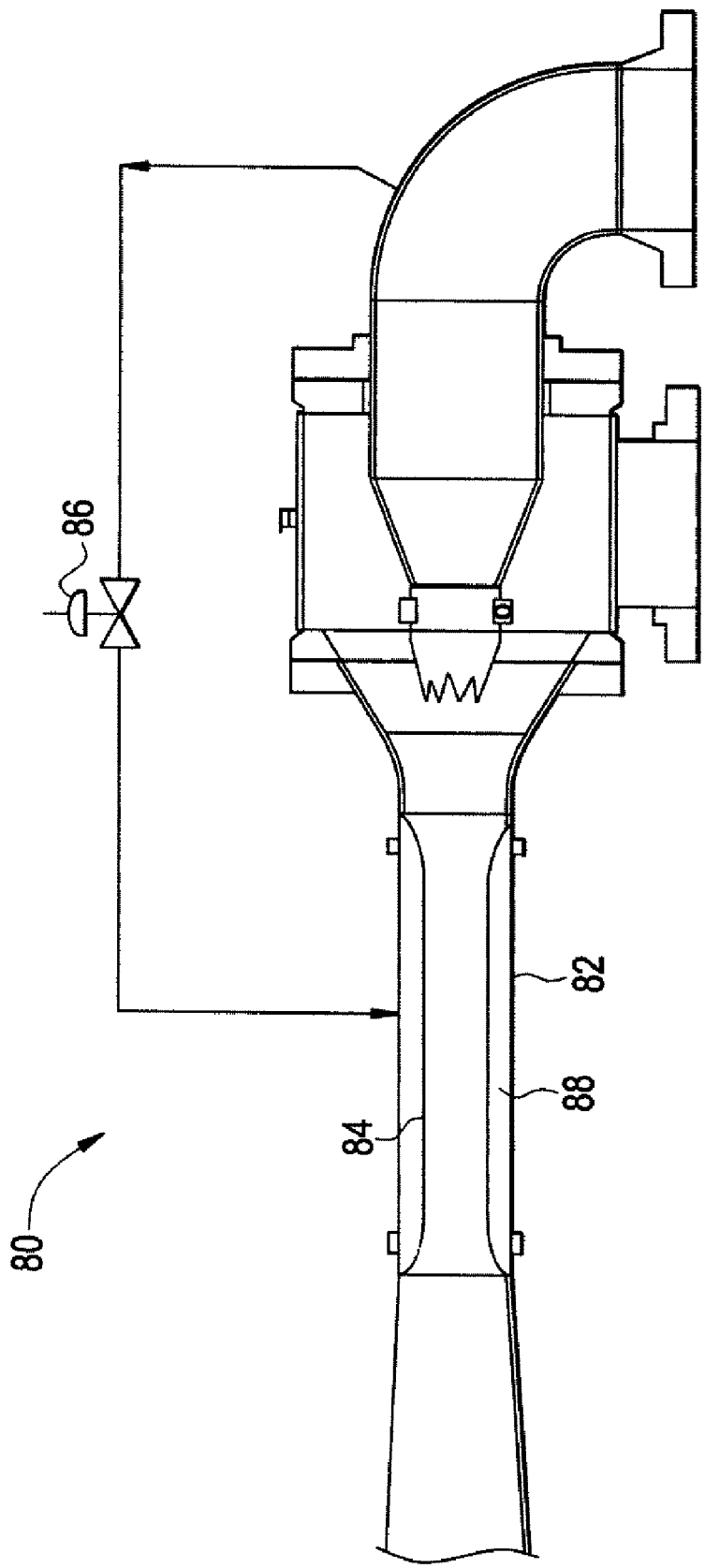
FIG. 6 illustrates a mixing tube 82 comprising a flexible layer 84 made in accordance with an embodiment of the present invention.

In an alternate embodiment, the mixing tube may comprise a flexible layer adapted to compress or stretch, thereby allowing a mixing tube diameter to change. As used herein, "mixing tube diameter" refers to the average internal diameter of the mixing tube. An embodiment of such a mixing tube 82 is illustrated in FIG. 6. The mixing tube comprises a flexible layer 84 including two concentric arc mixing tube portions inserted into the mixing tube 82. Each of the two concentric arc mixing tube portions may be adapted to have its arc radii change, thereby allowing the mixing tube diameter to change. In this embodiment, the flexible layer 84 comprises metal sheet material. However, it should be understood that any flexible material known in the art and suitable for use in the ejector application may be used as the flexible layer. Also, in alternate embodiments, mixing tubes may comprise two or more concentric arc mixing tube portions.

In some embodiments, a device for automatically compressing or stretching the flexible layer may also be provided.

As illustrated in FIG. 6, an embodiment of such a device can comprise a valve 86 and a pressure regulated chamber 88. The valve 64 may be regulated using a feedback control associated with the motive inlet pressure and/or the turbine pressure requirements or any other type of control system.

In other embodiments, the device for automatically compressing or stretching the flexible layer may comprise other components, including, but not limited to, electric motor driven devices. In alternate embodiments, the compressing or stretching the flexible layer may be carried out manually.

Therefore, in this embodiment, when more pressure is applied to the pressure regulated chamber 88, the flexible layer may have the arc radii of the concentric arc mixing tube portions reduced. As a result of this change in the concentric arc mixing tube portions, the mixing tube diameter may reduced. Accordingly, when less pressure is applied to the pressure regulated chamber 88, the arc radii of the concentric arc mixing tube portions may increase, thereby increasing the mixing tube diameter.

In some embodiments, the mixing tube 44, 82 may have a mixing tube diameter ranging from about 3 inches to about 10 inches. In other embodiments, the mixing tube 44, 82 may have a mixing tube diameter ranging from about 4 inches to about 8 inches. In still other embodiments, the mixing tube 44, 82 may have a mixing tube diameter ranging from about 5 inches to about 6 inches.

It should be understood that various embodiments of the motive nozzles and mixing tubes described herein may be used in combination with each other in a single ejector. For example, an ejector may include a separably securable motive nozzle which also comprises concentric arc nozzle portions and/or a mixing tube comprising a flexible layer.

Without being bound by theory, it is believed that embodiments of the ejectors and nozzles of the present disclosure allow the motive nozzle of an ejector to be changed either by replacement or adjustment of the nozzle geometry or nozzle diameter for different operating conditions to provide optimal system efficiency. In addition, the ejectors including embodiments of the mixing tube of the present disclosure allow the mixing tube diameter to be adjusted for further optimization of system efficiency. Thus, the replacement of the whole ejector when a different motive nozzle may be required for different operating conditions may be avoided. Rather, embodiments of the ejector allow for separate adjustment of the nozzle and/or mixing tube to improve of efficiency for particular operating conditions, which may be ambient temperature conditions (e.g., different seasons of the year or different geographical locations).

For example, a method for providing cooling air and/or sealing air to a turbine may comprise 1) providing a first airflow from a compressor, 2) providing a second airflow from the compressor, 3) mixing the first airflow with at least a portion of the second airflow in an ejector including a first separably secured motive nozzle at a first operating temperature, 4) replacing the first motive nozzle with a second separably securable motive nozzle, and 5) mixing the first airflow with at least a portion of the second airflow in the ejector including the second motive nozzle at a second operating temperature. In some embodiments, the first operating temperature may be less than the second operating temperature, and wherein the first motive nozzle has a first diameter and the second motive nozzle has a second diameter smaller than the first diameter.

Also without being bound by theory, it is believed that nozzle diameter, mixing tube diameter, and the ratio of nozzle diameter to mixing tube diameter are significant factors affecting ejector performance. FIG. 7 shows the results of Computational Fluid Dynamics models for evaluation of ejector performance with different nozzle diameters. These results show the entrainment ratio of three motive nozzles having different nozzle diameter to mixing tube diameter ratios (i.e., 2.8" 3.1", and 3.2") as related to the entrainment prediction factor (EPF), which is a function of ejector operation ambient temperature. The graph indicates that high entrainment may desirably occur on hot days with lower total flow and more robust entrainment may desirably occur on colder days with higher total flow. These results indicate that when the environmental temperature is low (i.e., cold), use of a larger nozzle diameter and smaller mixing tube diameter would improve efficiency because the larger nozzle diameter would increase suction. When the environmental temperature is high (i.e., hot), a smaller nozzle diameter and larger mixing tube diameter should be used to allow higher suction flows. In other embodiments, a larger mixing tube may have better performance in hot climate and smaller mixing tube diameter may have better performance for cold weather.

Again without being bound by theory, an ejector system may be made with a new design for a particular operating environment by performing iterative optimization. The nozzle diameter may be input into a CFD model to relate the entrainment ratio to the ambient temperature (e.g., an operating location's seasonal temperature) to obtain a seasonal accumulative entrainment ratio. This model could be reproduced for various nozzle sizes to match the seasonal accumulative entrainment ratio (corrected for overflow performance) with the turbine stage flow requirement. Thus, certain embodiments of the ejector may have the nozzle diameter and mixing tube diameter optimized for different geographical locations, while only the nozzle diameter may be optimized for seasonal differences in operating temperature. In another example, the motive nozzle diameter may be optimized so that the overflow of the turbine stage may be at a minimum on hot days.

It should be apparent that the foregoing relates only to the preferred embodiments of the present application and that numerous changes and modifications may be made herein by one of ordinary skill in the art without departing from the generally spirit and scope of the invention as defined by the following claims and the equivalents thereof.

We claim:

1. An ejector comprising:
   a motive inlet;
   a motive nozzle separably secured to the motive inlet, the motive nozzle comprising:
      at least two concentric arc nozzle portions in communication with a pressure chamber and a spring:
      the pressure chamber being in communication with a diverted flow from the motive inlet having a nozzle pressure valve so as to vary the position of the at least two concentric arc nozzle portions to increase or decreases a flow path diameter through the motive nozzle;
   a suction chamber about the motive nozzle;
   a suction fluid inlet to the suction chamber;
   a mixing tube in fluid communication with the suction chamber and the motive nozzle;
   a diffuser in fluid communication with the mixing tube and distal from the suction chamber and the motive nozzle; and
   an outlet from the diffuser.

2. The ejector of claim 1, wherein the motive inlet comprises a first flange, the motive nozzle comprises a plate ring, and the suction chamber comprises a second flange, and wherein the motive nozzle is separably secured to the motive inlet by separably securing the plate ring between the first flange and the second flange.

3. The ejector of claim 1, wherein the motive nozzle has a nozzle geometry comprising a chevron shape or a lobe shape.

4. The ejector of claim 1, wherein the motive nozzle has a nozzle diameter ranging from about 1 inch to about 8 inches.

5. The ejector of claim 1, wherein the mixing tube has a mixing tube diameter ranging from about 3 inches to about 10 inches.

6. The ejector of claim 1, wherein the mixing tube comprises a flexible layer adapted to compress or stretch, thereby allowing a mixing tube diameter to change.

7. The ejector of claim 6, wherein the flexible layer comprises at least two concentric arc mixing tube portions, and wherein each of the at least two concentric arc mixing tube portions arc radii change, thereby allowing the mixing tube diameter to change.

8. The ejector of claim 6, further comprising a device for automatically compressing or stretching the flexible layer.

9. The ejector of claim 1, wherein the ejector is adapted to mix a first flow and a second flow to provide a cooling fluid or a sealing fluid from a compressor to a turbine, and wherein the compressor comprises a first compressor stage and a second compressor stage and the turbine comprises a first turbine stage and a second turbine stage, and wherein the first flow flows along a first flow path connecting the first compressor stage and the first turbine stage, the second flow flows along a second flow path connecting the second compressor stage and the second turbine stage, a crossover flow path connects the first flow path and the second flow path, and the ejector is in fluid communication with the crossover flow path and the first flow path or the second flow path.

\* \* \* \* \*